J. R. Grout.

Reverberating Furnace.

Reissued Apr. 9, 1867.

No. 2,549.

Witnesses;
C. S. Crump
J. Mowell.

Inventor;
John R. Grout
by D. P. Holloway & Co
his attys.

United States Patent Office.

JOHN R. GROUT, OF DETROIT, MICHIGAN.

*Letters Patent No.* 56,552, *dated July* 24, 1866; *reissue No.* 2,549, *dated April* 9, 1867.

IMPROVEMENT IN REVERBERATORY AND OTHER METALLURGIC FURNACES.

The Schedule referred to in these Letters Patent and making part of the same.

TO ALL WHOM IT MAY CONCERN:

Be it known that I, JOHN R. GROUT, of Detroit, in the county of Wayne, and State of Michigan, have invented certain new and useful Improvements in Reverberatory and other Draught and Blast Furnaces, for treating metals, which have a bridge wall, or its equivalent, and a heating or combustion-chamber; and I do hereby declare that the following is a full, clear, and exact description of the same, reference being had to the annexed drawings, making part of this specification, in which—

Figure 3:
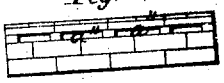

Figure 3, a similar section of the bridge wall near the melting apartment.

Figure 4:
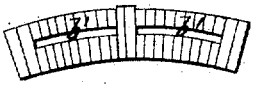

Figure 4, a similar section of the arch over the fire-room and bridge wall.

Figure 5:
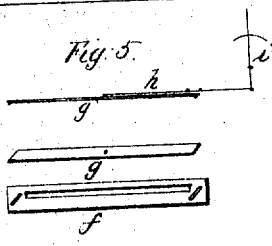

Figure 5 shows the part forming the valve in the passage-way through the bridge wall.

Figure 6:
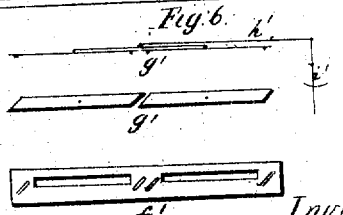
Figure 6:
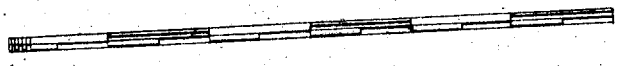

Figure 6 shows the corresponding parts of the valve in arch passage-ways.

Figure 7:
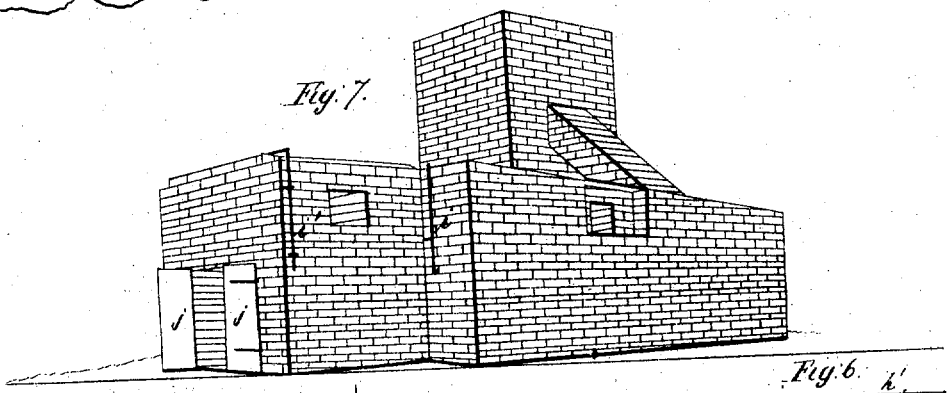

Figure 7, a perspective view of the furnace as completed.

The same letters are employed in the designation of same parts in the several figures.

My invention consists in so constructing and operating furnaces, of the class described in the title hereof, that atmospheric air is heated in traversing passages constructed for that purpose in either the bridge wall or arch over the fire-chamber, or in both, and introduced in regulated currents and mingled with the gaseous products of the burning fuels as they enter the heating or melting-chamber of the furnace, so as to effect in the said chamber the combustion of these gases, and at the same time, thereby, while increasing the heat, protect metals that may be under treatment from the injurious effects of unconsumed gases, and in utilizing heat hitherto not used, and preserving the masonry of the furnace in the parts connected.

In constructing furnaces with my improvements applied, I make the chimney with less power of draught, the bridge wall of greater thickness, and the fire-chamber of greater depth and area of grate surface than is usual. I also place doors, closing the chamber, below the grate-bars, as also the opening for feeding the fires, so that the draught may be cut off when required.

I will now describe my improved furnace, so that persons skilled in the art may construct and operate the same. The case presented in the drawings is the application of my improvements to a reverberatory furnace. The same principle, with modifications such as would immediately suggest themselves, may be applied to other furnaces of the kind described in the title.

Figure 1:
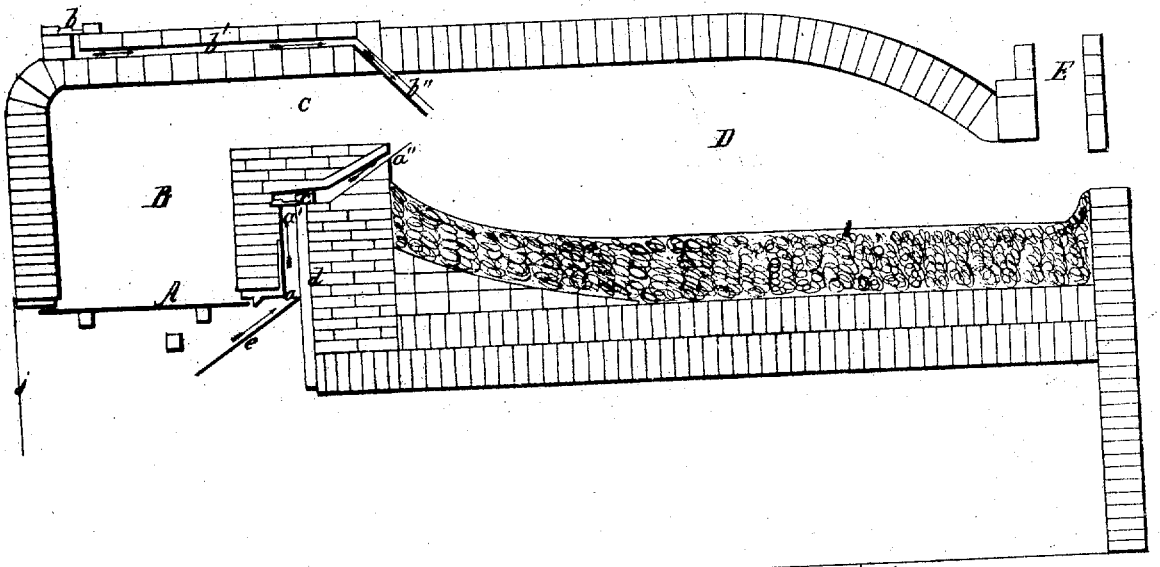
Figure 1 is a vertical longitudinal section.
Figure 2:
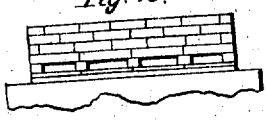
Figure 2 is a vertical transverse section through the bridge wall.

In the drawings, A represents the grate; B the fire-room; C the passage-way over the bridge wall; D the heating or melting-apartment, and E the flue. The bridge wall I construct with a passage-way, through which a current of atmospheric air may pass from the chamber under the grate into the heating or melting-apartment, entering the same from the bridge wall near the top and behind the same, as shown in figs. 1 and 3. The top of the passage-way has such an inclination that the current of air passing through it, and highly heated by contact with the sides of the bridge wall, shall be projected upward and diagonally across the current of the gaseous products of combustion flowing from the fire-room into the apartment D through the passage C, thereby effecting their thorough commingling. This passage-way is shown at *a a′ a″*, in figs. 1, 2, and 3. A similar passage-way, *b b′ b″*, is constructed through the arch over the fire-room and passage C, through which the hot air is discharged, as shown in fig. 1, with a downward inclination. These passage-ways may be used concurrently or independently. They introduce the air in thin currents, extending nearly or entirely the width of the passage C. These passage-ways may be made with several entering air-spaces, as shown in figs. 2 and 3, where the bridge-wall passage is represented as subdivided into four parts, and in fig. 4, where the arch passage is shown divided into two subdivisions. This arrangement may be varied as desired, preserving, however, the general principle of construction, which I prefer, of the introduction of the hot air in thin sheet spaces through the whole width of the passage C. The plate *d* is used for strengthening the wall only when necessary. The plate *e* may be hinged to the plate *d* and extended forward under the grate-bars. The passage of air into the chamber D, in the manner described, should be subjected to the discretionary control of the operator, so as to admit the requisite quantity of air. This may be effected in divers ways. One mode, which I prefer, I have shown. Valves are placed in these passages at *a′* and *b* (fig. 1) respectively. The form of the valve in the bridge-wall passage is shown in fig. 5; that of the arch passage is shown in fig. 6. In the former case, *f* is a plate, having a sufficient opening through it for the passage of the required current of air. A sliding-valve, *g*, rests upon this plate, on which it slides diagonally, controlled by the pins in the bottom of the plate *g*, which pass through diagonal slots near the end of the plate *f*. The valve *g* is actuated by any convenient arrangement of levers, *h i*, passing through the furnace walls. The same description will apply to fig. 6, which is shown with two openings instead of one. By means of these valves either or both of the passages may be closed entirely or they may be opened with exactness, more or less, as required. The doors *j j* close the entrance to the chamber below the grates, while the openings through which the fuel is introduced are closed in like manner. By these doors the draught is regulated as desired. Both the currents of hot air are effective for furnishing an increased supply of oxygen required for the perfect combustion of the gaseous products carried over the bridge wall from the fire within the chamber D, and either may be used for that purpose, or both may be used, crossing their jets and more perfectly accomplishing the work of intermixing the air and the unconsumed gaseous products of combustion. The bridge-wall passage, however, affords an advantage which cannot be accomplished by the use of the arch passage, viz, in the desulphurization or the oxidation of the ores placed on the bottom of the chamber D, which is effected by causing the admission of atmospheric air in slight excess, which may be accomplished either by increasing the supply or diminishing the supply of gaseous products. A bridge, C, is extended across the passage-way to prevent the flow of molten metal down the passage-way and over the valve.

I have shown one mode of constructing these air-passage ways, but I do not confine myself to this particular arrangement. Heretofore a large amount of heat has been lost by radiation from the walls of the furnace. The more widely the hot-air passages are distributed through the walls of the fire-rooms and of the furnace, the more economical will be the consumption of fuel, as the heat now lost will be, more of it, taken up by the air and carried into the combustion or melting-chamber. It will, therefore, be desirable to carry these hot-air passages around the wall more than I have shown them in the drawings.

Another advantage derived from this construction of furnaces will be that the external walls, relieved from the intensity of the heat which will be taken up by the air in the intermediate passage-ways, will be far more durable than those built according to the mode heretofore in use.

What I claim as my invention, and desire to secure by Letters Patent, is—

1. In a reverberatory or other furnace for treating metals, having a bridge wall or its equivalent, and a combustion or melting-chamber, the atmospheric passage-way *a a′ a″* through the bridge wall, so constructed that a thin and broad current or currents of atmospheric air, heated in passing through the wall, shall be discharged at or near the top of the bridge wall, and in rear of the same, diagonally across the course of the currents of the gaseous products of combustion on entering the combustion or melting-chamber after passing from the fire-room.

2. In such a furnace, the atmospheric passage-way *b b′ b″* through the arch over the fire-room and bridge wall, so constructed that a broad and thin current or currents of atmospheric air, heated in passing through the wall, shall be discharged at a line over or nearly over the rear side of the bridge wall, downwardly and diagonally across the course of the current of the gaseous products of combustion on entering the combustion or melting-chamber after passing from the fire-room.

3. In such a furnace, the combination of an atmospheric air-passage way, constructed through the bridge wall, with a similar passage-way through the arch over the same, said passage-ways being respectively constructed substantially as described.

4. The passage-ways *a a′ a″* or *b b′ b″*, when constructed respectively in the bridge wall and arch, and subdivided in such manner as to discharge the hot air, as set forth, through two or more orifices with narrow openings, the series extending across or nearly across the entire width of the passage over the bridge wall.

5. The atmospheric passage-ways *a a′ a″* and *b b′ b″*, constructed so that the air will be heated in passing through the furnace walls, when so arranged with valves or other throttles that the flow of air through them may be regulated at discretion, substantially as set forth.

6. The bridge C across the bridge wall above the valve, for the protection of the same, substantially as described.

7. So constructing such a furnace that the heat absorbed by the furnace walls may be taken up by currents of air passing through passage-ways constructed in the furnace walls, which air, flowing through them, is afterwards discharged into and mingled with the gaseous products of combustion after the same have risen from the fuel upon the grates and passed out of the fire-room, substantially as described.

In testimony whereof I have signed my name to this specification before two subscribing witnesses.

JOHN R. GROUT.

Witnesses:

R. MASON,

JOHN S. HOLLINGSHEAD.